United States Patent [19]

Moroto et al.

[11] Patent Number: 5,056,376
[45] Date of Patent: Oct. 15, 1991

[54] MANUAL SPEED SELECTOR OF AUTOMATIC VEHICLE TRANSMISSION

[75] Inventors: Shuzo Moroto; Shiro Sakakibara; Hidehiro Kondo; Takesi Inuzuka; Masahiro Hasebe, all of Aichi, Japan

[73] Assignee: Aisin AW Co., Ltd., Japan

[21] Appl. No.: 612,062

[22] Filed: Nov. 7, 1990

[30] Foreign Application Priority Data

Nov. 9, 1989 [JP] Japan ................................. 1-291739

[51] Int. Cl.⁵ ............................................. F16H 59/04
[52] U.S. Cl. .................................... 74/335; 74/473 R; 74/625
[58] Field of Search ...................... 74/625, 335, 473 R

[56] References Cited

U.S. PATENT DOCUMENTS

| | | | |
|---|---|---|---|
| 4,663,713 | 5/1987 | Cornell et al. | 74/625 X |
| 4,960,008 | 10/1990 | Yen et al. | 74/335 X |
| 4,987,792 | 1/1991 | Mueller et al. | 74/335 X |

Primary Examiner—Dirk Wright
Attorney, Agent, or Firm—Lorusso & Loud

[57] ABSTRACT

A manual speed selector of an automatic vehicle transmission in which a line pressure is supplied from a manual valve capable of being changed over by a shift lever to control a plurality of solenoid valves so as to selectively supply hydraulic pressure to frictional engagement devices by shift valves. The shift lever can be moved between an automatic shift mode position and a manual shift mode position, and a transitive position is provided between these two mode positions. At the transitive position, the manual valve is set in a position such as to supply hydraulic pressure to set a neutral state based on the control of the solenoid valves. The shift lever can be immediately moved from this position to directly select any speed in the automatic shift mode or the manual shift mode. The above solenoid valves, a hydraulic control solenoid valve and a lock-up clutch engaging solenoid valve are controlled to enable rapid shifting in the manual shift mode as well as smooth shifting in the automatic shift mode.

16 Claims, 12 Drawing Sheets

FIG. 4

| SHIFT POSITION | | SOLENOID | | | | CLUTCH | | | | BRAKE | | | | ONE-WAY CLUTCH | | | |
|---|---|---|---|---|---|---|---|---|---|---|---|---|---|---|---|---|---|
| | | $S_1$ | $S_2$ | $S_3$ | $S_4$ | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | × | O | × | | | | | | | | | O | | | | |
| R | | × | O | × | | | | O | | | | O | O | | | | |
| N | | × | O | × | | | | | | | | | O | | | | |
| D | 1st | × | O | × | | | O | | | | | | O | | | O | O |
| D | 2nd | O | O | × | ● | | O | | | O | O | | O | | O | | O |
| D | 3rd | O | × | × | ● | | O | | O | O | O | | | | O | | |
| D | 4th | × | × | × | ● | O | O | | O | | O | | | O | | | |
| D | 5th | × | × | O | ● | O | | | O | O | O | | | | | | |
| D | (N) | O | × | O | | | | | O | O | O | | | | | | |
| M | 1st | × | O | O | | | O | | | | | O | O | | | | |

| NOTE | | |
|---|---|---|
| O | ON | ENGAGED |
| × | OFF | RELEASED |
| ● | ON : L-UP CLUTCH DUTY , OFF : RELEASED | |

MANUAL SPEED SELECTOR OF AUTOMATIC VEHICLE TRANSMISSION

BACKGROUND OF THE INVENTION

This invention relates to a manual speed selector of an automatic vehicle transmission whereby the driver can select, by manual operation, a shift stage that he or she wishes to set.

Conventionally, as the shift lever between running range, e.g., a range D, a range S, and a range L, in an automatic vehicle transmission, a predetermined shift stage is automatically selected according to the vehicle speed and the throttle opening in each range, thereby automatically shifting the transmission. As the shift lever is moving along an I-shaped straight line pattern, a manual valve linked thereto in the hydraulic circuit is moved to selectively operate frictional engagement devices according to the selected range.

However, the shift speed that a driver wishes to select at a given operating state according to the driver's individual preference and the shift stage automatically selected by the automatic transmission does not always coincide with the shift stage the driver wishes to select. Manual transmissions are advantageous in this respect.

An automatic vehicle transmission has been provided which is arranged to enable manual speed changes and to enable the driver to select a shift stage (refer to Japanese Patent Laid-Open No. 61-157855).

In this transmission, an H-shaped shift pattern similar to a pattern for manual shifting is formed so as to be connected to the conventional I-shaped pattern, shift stage positions for manual shifting are set in the H-shaped pattern, and a switch operated by the arrival of the shift lever is provided at each shift stage position. When the shift lever is moved from the I-shaped straight line pattern to one of the positions of the H-shaped pattern, the shift lever is disconnected from the manual valve of the hydraulic circuit, and frictional engagement devices are selected and operated by a signal supplied from the switch provided at the corresponding H-shaped pattern position to select the the corresponding shift stage.

In this type of manual speed selector for automatic vehicle transmissions, however, the shift lever is necessarily passed through the D range position in which automatic shifting is effected, when the shift lever is moved from the I-shaped straight line pattern to the H-shaped pattern. However, a problem in that the driver will feel a difference between the shifting operation and the motion of the vehicle is encountered. For example, if the shift lever is moved from a range N to a first speed position in the H-shaped pattern, the shift therebetween is effected via a first speed in the range D, that is, the first speed is selected after creep-starting. Also, a manual shift for starting in second speed must be effected via the first speed in the range D and the driver does not feel good responsiveness to manual shifting. In the case of a shift from, for example, a fourth speed to the range N, the shift also involves automatic shifting in the range D, and the same problem is encountered.

SUMMARY OF THE INVENTION

It is an object of the present invention to provide a manual speed selector for an automatic vehicle transmission capable of enabling the driver to have an appropriate feeling of the shifting that he or she wants as well as enabling the transmission to be manually shifted.

To achieve this object, according to the present invention, there is provided a mechanism having a manual valve positioned by a shift lever, a plurality of shift valves controlled by solenoid valves, a lock-up solenoid valve for controlling a lock-up clutch of a torque converter and a hydraulic control solenoid valve for controlling hydraulic pressure supplied to a plurality of frictional engagement devices. Hydraulic pressure is supplied to or is discharged from the frictional engagement devices by switching the shift valves to automatically shift the transmission.

The shift lever can be moved between an automatic shift mode position and a manual shift mode position, and a transitive position is provided between the automatic shift mode position and the manual shift mode position. In the transitive position, the manual valve is set in a position such as to supply hydraulic pressure to the frictional engagement devices and to establish by the control of the solenoid valves, a neutral state in which the power of the engine is not transmitted to the transmission. Further, the solenoid valves are controlled differently as between the automatic mode and the manual shift mode.

According to the present invention, the provision of the transitive position at which selection of the neutral or each of shift stage is possible, makes it possible to immediately move the shift lever to directly select any speed in the automatic shift mode or the manual shift mode. Shifting can be effected in different ways with respect to the two shift modes; the transmission is shifted smoothly in the automatic shift mode or is shifted rapidly in the manual shift mode by advancing the timing of engagement of the lock-up clutch.

The delay between shift determination and shift commanding at the time of shifting, the timing of engagement of the lock-up clutch and the level to which the line pressure is set at the time of shifting may be set so that the transmission is shifted smoothly in the automatic shift mode or is shifted rapidly in the manual shift mode.

Thus, the automatic transmission in accordance with the present invention is capable of being manually shifted and also capable of manually selecting any speed by shifting via the transitive position at which the neutral state is established. Also, different operating conditions for the solenoid valves are selected with respect to the automatic shift mode and the manual shift mode, thereby enabling the transmission to be shifted smoothly in the case of automatic shifting or rapidly in the case of manual shifting. It is therefore possible for the driver to always easily select an appropriate shift feeling that he or she wants.

BRIEF DESCRIPTION OF DRAWINGS

FIG. 4 is a diagram of the operation of the automatic vehicle transmission of the present invention;

FIGS. 7(a) to 7(h) are diagrams of the operation of the manual valve disconnection device shown in FIG. 5;

FIGS. 7(a) to 7(d) are cross-sectional views taken along the line A—A of FIG. 5;

FIG. 7(e) to 7(h) are cross-sectional views taken along the line B—B of FIG. 5;

DESCRIPTION OF PREFERRED EMBODIMENT

An embodiment of the present invention will be described below in detail with reference to the accompanying drawings.

Figure 2:
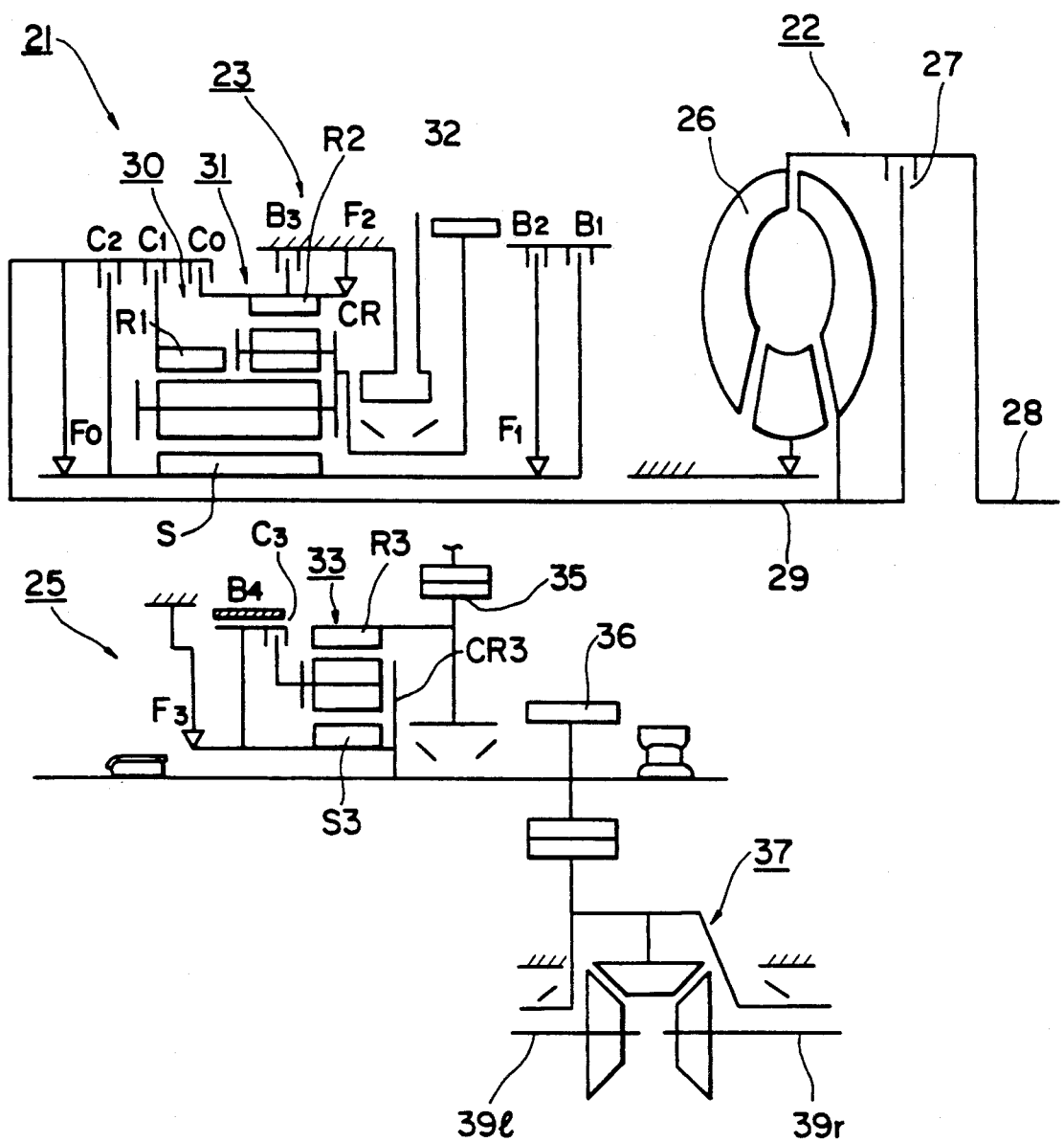
FIG. 2 is a diagram of the mechanical construction of the automatic vehicle transmission of the present invention.

FIG. 2 shows the construction of an automatic vehicle transmission in accordance with the present invention.

As shown in FIG. 2, a five-speed automatic transmission 21 has a torque converter section 22, a four-speed automatic shift gear mechanism section 23 constituting a main shift gear unit, and an underdrive mechanism section 25 constituting a sub shift gear unit.

The torque converter section 22 has a torque converter 26, and a lock-up clutch 27. The torque of an engine crankshaft 28 is transmitted to an input shaft 29 through a fluid couples or by mechanical connection of the lock-up clutch 27.

The four-speed shift gear mechanism section 23 has a single planetary gear unit 30 and a dual planetary gear unit 31. In the two planetary gear units 30 and 31, a carrier CR and a sun gear S are integrally formed. The input shaft 29 is connected to a ring gear R1 of the single planetary gear unit 30 through a first clutch $C_1$ and is also connected to the sun gear S through a second clutch $C_2$.

The sun gear S is directly braked by a brake $B_1$. A second brake $B_2$ prevents the sun gear S from rotating in one direction means of a first one-way clutch $F_1$. A ring gear R2 of the dual planetary gear unit 31 is connected to the input shaft 29 through a third clutch $C_0$. A third one-way clutch $F_0$ for stopping the sun gear S so that the number of revolutions of the sun gear S does not exceed the number of revolutions of the input shaft 29 is interposed between the input shaft 29 and the sun gear S. The carrier CR is connected to a counter drive gear 32 which serves as an output for the four-speed automatic shift gear mechanism section 23.

The underdrive mechanism section 25 has a single planetary gear unit 33. A ring gear R3 of the single planetary gear unit 33 is connected to a counter driven gear 35 in constant engagement with the counter drive gear 32, and a carrier CR3 is connected to an output pinion 36.

Further, a sun gear S3 is prevented a fourth one-way clutch $F_4$ from rotating in one direction and is braked by a fourth brake $B_4$. The sun gear S3 is connected to the carrier CR3 through a fourth clutch $C_3$. The output pinion 36 is connected to left and right front axles 39r and 39l through a differential mechanism 37.

Figure 3:
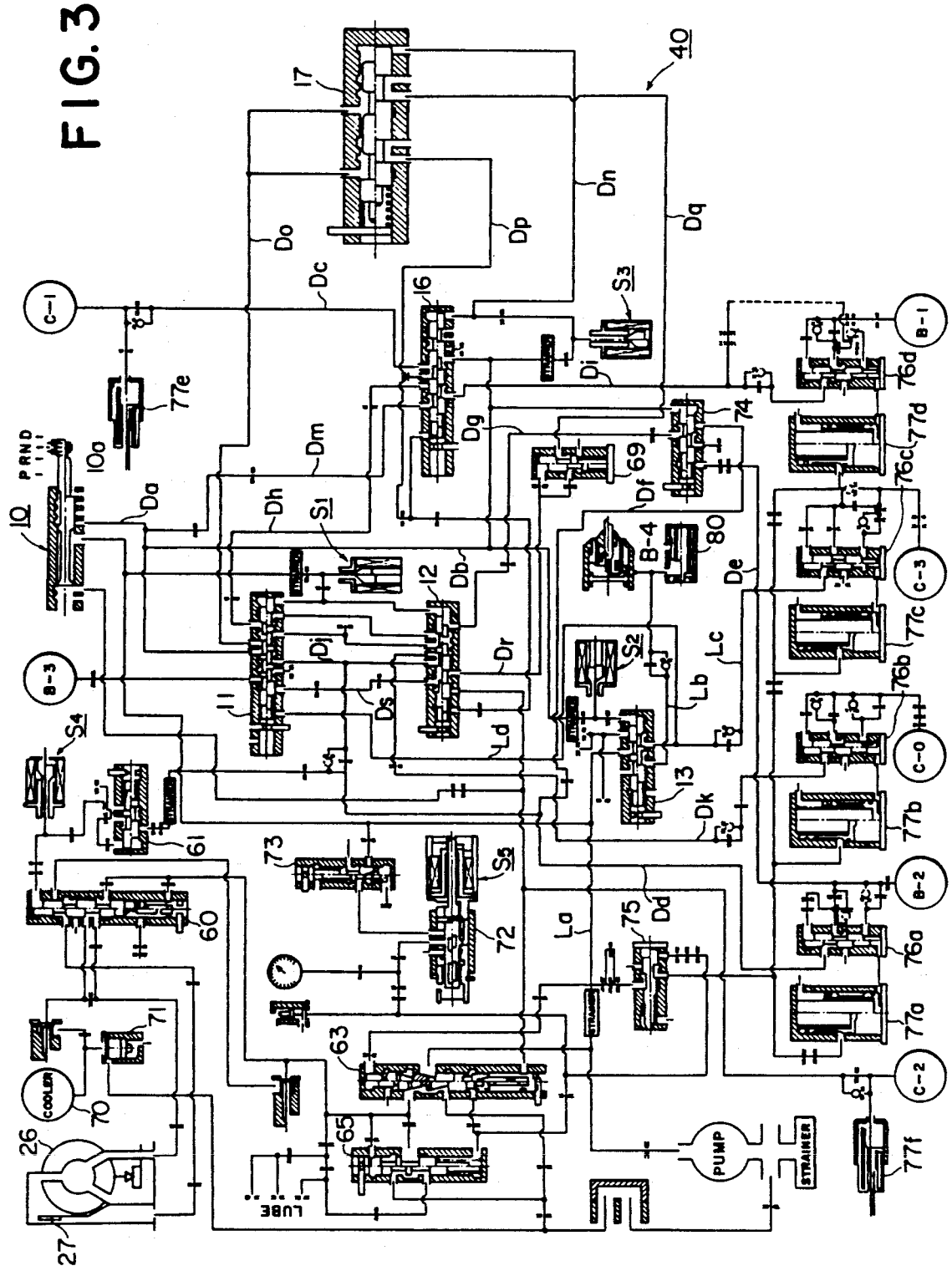
FIG. 3 is a diagram of a hydraulic circuit for controlling the automatic vehicle transmission of the present invention.

FIG. 3 shows a diagram of a hydraulic circuit for controlling the automatic vehicle transmission in accordance with the present invention.

A hydraulic circuit 40 includes hydraulic servos C0, C1, C2, and C3 for the clutches shown in FIG. 2, and other hydraulic servos B1, B2, B3 and B4 for the brakes also shown in FIG. 2. The hydraulic circuit 40 also includes a manual valve 10 having a spool 10a for movement in the manual valve 10 to transmit pressure in each range, a 1-2 shift valve 11 constituting a first shift valve, a 3-4 shift valve 12 constituting a second shift valve, a 2-3 shift valve 13 constituting a third shift valve, a 4-5 shift valve 16, and a B3 changeover valve 17.

First to third solenoid valves $S_1$ to $S_3$ are also provided. The first solenoid valve $S_1$ serves to control the 1-2 shift valve 11 and the 3-4 shift valve 12. The second solenoid valve $S_2$ serves to control the 2-3 shift valve 13, and the third solenoid valve $S_3$ serves to control the 4-5 shift valve 16 and the B3 changeover valve 17.

There are also provided a lock-up control valve 60, a fourth solenoid valve $S_4$ for controlling the lock-up control valve 60 with respect to the duty ratio, and a lock-up modulator valve 61 for stabilizing the fourth solenoid valve $S_4$.

There are further provided a primary regulator valve 63, a secondary regulator valve 65, a low modulator valve 69, a cooler 70, a cooler bypass valve 71, a throttle valve 72 for freely controlling hydraulic pressure, operated by a linear solenoid valve $S_5$, a solenoid modulator valve 73, a B1 sequence valve 74, and an accumulator control valve 75. The torque converter 26, the lock-up clutch 27 and a hydraulic pump P are also connected to this hydraulic circuit.

There are further provided the following pressure regulating valves and accumulators. Pressure regulating valves 76a, 76b, 76c, and 76d and accumulators 77a, 77b, 77c, and 77d are provided to operate in association with the second brake hydraulic servo B2, the third brake hydraulic servo C0, the fourth clutch hydraulic servo C3, and the first brake hydraulic servo B1, respectively. An accumulator 77e is provided for the first clutch hydraulic servo C1, and an accumulator 77f is provided for the second clutch hydraulic servo C2. A case mount type accumulator 80 is provided which communicates with the fourth brake hydraulic servo B4.

In the five-speed automatic transmission 21 having this construction, the first to fourth solenoid valves $S_1$ to $S_4$ of the hydraulic circuit 40 are operated according to the range selected by the manual valve 10 to effect predetermined operations of the clutches $C_0$ to $C_3$, the brakes $B_1$ to $B_4$ and the one-way clutches $F_0$ to $F_3$, as shown in the operation diagram of FIG. 4, thereby setting a range P (parking), a range R (reverse), a range N (neutral), each of first to fifth speeds in a range D (forward), a transitive neutral (N), or a manual first speed.

In a range D first speed state (1st position), the first solenoid valve $S_1$ is off, i.e., in a supplying state, the second solenoid valve $S_2$ is on, i.e., in a draining state, and the third solenoid valve $S_3$ is off, i.e., in a draining state. Accordingly, the 1-2 shift valve 11 and the 3-4 shift valve 12 are in upper half positions as viewed in FIG. 3, while the 2-3 shift valve 13, the 4-5 shift valve 16 and the B3 changeover valve 17 are in lower half positions as viewed in FIG. 3.

In this state, a line pressure oil passage La and an oil passage Da communicate with each other through the manual valve 10, and the line pressure thereof is supplied to the first clutch hydraulic servo C1 through an oil passage Db, the 4–5 shift valve 16, and an oil passage Dc. The line pressure in the line pressure oil passage La is also supplied to the fourth brake hydraulic servo B4 through the 2–3 shift valve 13 and a line pressure oil passage Lb. The first clutch $C_1$ is thereby engaged and the fourth brake B4 is thereby operated in the five-speed automatic transmission 21.

At this time the torque of the input shaft 29 is transmitted to the ring gear R1 of the single planetary gear unit 30 through the first clutch $C_1$. At this time also, the rotation of the ring gear R2 of the dual planetary gear unit 31 is stopped by the second one-way clutch $F_2$. The common carrier CR therefore rotates in a normal direction at a speed greatly reduced while rotating the sun gear S in the reverse direction, and the torque of the carrier CR is transmitted from the counter drive gear 32 to the counter driven gear 35 of the underdrive mechanism section 25. In the underdrive mechanism section 25, the fourth brake B4 and the fourth one-way clutch $F_3$ are operated so that the first speed of the whole of the five-speed automatic transmission 21 is obtained by the cooperation of the four-speed automatic shift gear mechanism section 23 in the first speed state and the underdrive mechanism section 25.

In the range D second speed state (2nd position), the first solenoid valve $S_1$ in the first speed state is turned on and changed over to a draining state. Then the 1–2 shift valve 11 and the 3–4 shift valve 12 are changed over to lower half positions so that the line pressure is supplied to the second brake hydraulic servo B2 through the oil passage Da, the 1–2 shift valve 11 and an oil passage Dd. In this state, therefore, the second brake $B_2$ is operated simultaneously with the engagement of the first clutch $C_1$.

As the second brake $B_2$ is operated, the B1 sequence valve 74 is changed over to the upper half position by the hydraulic pressure supplied through an oil passage Dh, so that oil passage Df and Dg communicate with each other. The first brake hydraulic servo B1 is operated by the pressure supplied through the 3–4 shift valve 12, 1–2 shift valve 11, the oil passage Dh, the 4–5 shift valve 16, and an oil passage Di.

The rotation of the sun gear S is stopped by the operation of the first one-way clutch $F_1$ based on the second brake $B_2$ and by the first brake $B_1$. By the torque of the ring gear R1 transmitted from the input shaft 29, therefore, the ring gear R2 of the dual planetary gear unit 31 is rotated in the normal direction and the carrier CR is rotated in the normal direction at a reduced speed. The torque of the carrier CR is transmitted from the counter drive gear 32 to the counter driven gear 35 of the underdrive mechanism section 25. The four-speed automatic shift gear mechanism section 23 in the second speed state and the underdrive mechanism section 25 cooperate to establish the second speed of the five-speed automatic transmission 21.

In D range third speed (3rd position), the second solenoid valve $S_2$ in the second speed state is turned off and changed over to a supplying state. Then the line pressure in the oil passage Da is applied to a right control oil chamber of the 2–3 shift valve 13 so that the 2–3 shift valve is changed over to the upper half position. The line pressure of the the line pressure oil passage La is thereby supplied to the fourth clutch hydraulic servo C3 through the shift valve 13 and a line pressure oil passage Lc. At this time the fourth brake hydraulic servo B4 is set in a drained state. The fourth brake B4 is thereby released and the fourth clutch C3 is thereby engaged to establish a direct connection with the underdrive mechanism section while maintaining the four-speed automatic shift gear meachnism section 23 in the second speed state. Consequently, third speed for the five-speed automatic transmission 21 can be obtained by the combination of the four-speed automatic shift gear mechanism section 23 in the second speed state and the underdrive mechanism section 25 directly connected to each other.

In a range D fourth speed state (4th position), the first solenoid valve S, in the third speed state is turned off and changed over to the supply state. Then the line pressure is applied to a right control oil chamber of the 3–4 shift valve 12 so that the 3–4 shift valve 12 is changed over to the upper half position. The line pressure is also supplied to a right control oil chamber of the 1–2 shift valve 11. Since the line pressure is previously applied to a left control oil chamber of this shift valve and since this pressure acts in cooperation with the urging force of a spring, the 1–2 shift valve 11 is restrained in the lower half position.

The D range pressure is therefore supplied to the third clutch hydraulic servo C0 via the 1–2 shift valve 11, the oil passage Da, the 3–4 shift valve 12, and an oil passage Dk. The third clutch $C_0$ is thereby engaged simultaneously with the engagement of the first clutch $C_1$ and the fourth clutch $C_3$ and the operation of the second brake $B_2$.

At this time the torque of the input shaft 29 is transmitted to the ring gear R1 of the single planetary gear unit 30 through the first clutch $C_1$ and to the ring gear R2 of the dual plnetary gear unit 31 through the third clutch $C_0$. Accordingly, the elements of the planetary gear units 30 and 31 are integrally rotated to transmit the torque from the carrier CR to the counter drive gear 32 at the same speed as the input shaft 29. A fourth speed output at the same rotational speed as the input shaft 29 is obtained through the output pinion 36 by the combination of the torque of the counter drive gear 32 and direct connection of the underdrive mechanism section 25.

In a range D fifth speed state (5th position), the solenoid valve $S_3$ in the fourth speed state is turned on and changed over to a supply state. Then the 4–5 shift valve 16 is changed over to an upper half position, the first clutch hydraulic servo C1 is drained through a drain port, and the line pressure is supplied to the first brake hydraulic servo B1 through the oil passage Da, the 4–5 shift valve 16 and the oil passage Di, thereby operating the first brake $B_1$.

At this time, the torque of the input shaft 29 is transmitted to the ring gear R2 of the dual planetary gear unit 31 through the third clutch $C_0$ while the sun gear S is stopped. The carrier CR therefore rotates at high speed while racing the ring gear R1 of the single planetary gear unit 30 at an increased speed. The high speed torque of the carrier CR is transmitted as an overdrive torque to the counter drive gear 32. This overdrive torque acts in cooperation with the underdrive mechamism section 25 in the directly connected state to provide the fifth speed of the five-speed automatic transmissin 21.

The above-described operation is performed in an automatic shift mode. According to the present invention, a predetermined shift stage is set by the combination of on and off states of the above-described solenoid valves when a manual shift mode signal is received. The first speed stage in a manual shift mode, however, is different from that in the automatic shift mode while the other shift stages are equal to those in the automatic shift mode.

That is, during running in the automatic shift mode, the brake for each one-way clutch is operated for braking at the corresponding shift stage except for the first speed stage, thereby preventing engine brake failure due to a free state of the one-way clutch. However, if the first speed is selected during downhill running, the second one-way clutch $F_2$ is freed and the engine brake does not work.

To avoid this problem, when the first speed is selected in the manual shift mode, the third solenoid valve $S_3$ is turned on and changed over to the supply state, control pressure is supplied to the B3 changeover valve 17 through an oil passage Dn, thereby changing over the B3 changeover valve 17 to an upper half position. The control pressure is thereby applied to a left control oil chamber of the 3-4 shift valve 12 through the oil passages Da and Dp so that the 3-4 shift valve 12 is changed over to the lower half position. As a result, the line pressure is supplied to the third brake hydraulic servo B3 via the oil passage Da, the B3 changeover valve 17, an oil passage Dq, a low modulator valve 69, an oil passage Dr, the 3-4 shift valve 12, an oil passage Ds and the 1-2 shift valve 11, thereby operating the third brake $B_3$ and enabling engine braking.

According to the present invention, a manual shift is not effected via any D range shift stage in the conventional manner. In other words manual shift can be effected without shifting through D range shift stage. For this manual shift, a neutral state is provided in which the driving force of the engine is not transmitted to the transmission while the manual valve 10 of the hydraulic circuit 40 is at a D range position, as shown in (N) of the operation table of FIG. 4.

That is, the first solenoid valve $S_1$ is turned on and set in the draining state, the second solenoid valve $S_2$ is turned off and set in the supply state, and the third solenoid valve $S_3$ is turned on and set in the supply state, so that the 1-2 shift valve 11 and the 3-4 shift valve 12 are set in the lower half positions while the 2-3 shift valve 13 and the 4-5 shift valve 16 are set in the upper half positions. The clutches $C_0$, $C_1$, and $C_2$ are thereby released and the neutral state is established.

The operation in the range P, R, or N is as shown in FIG. 4, and will not be described in detail in this specification.

Figure 1:
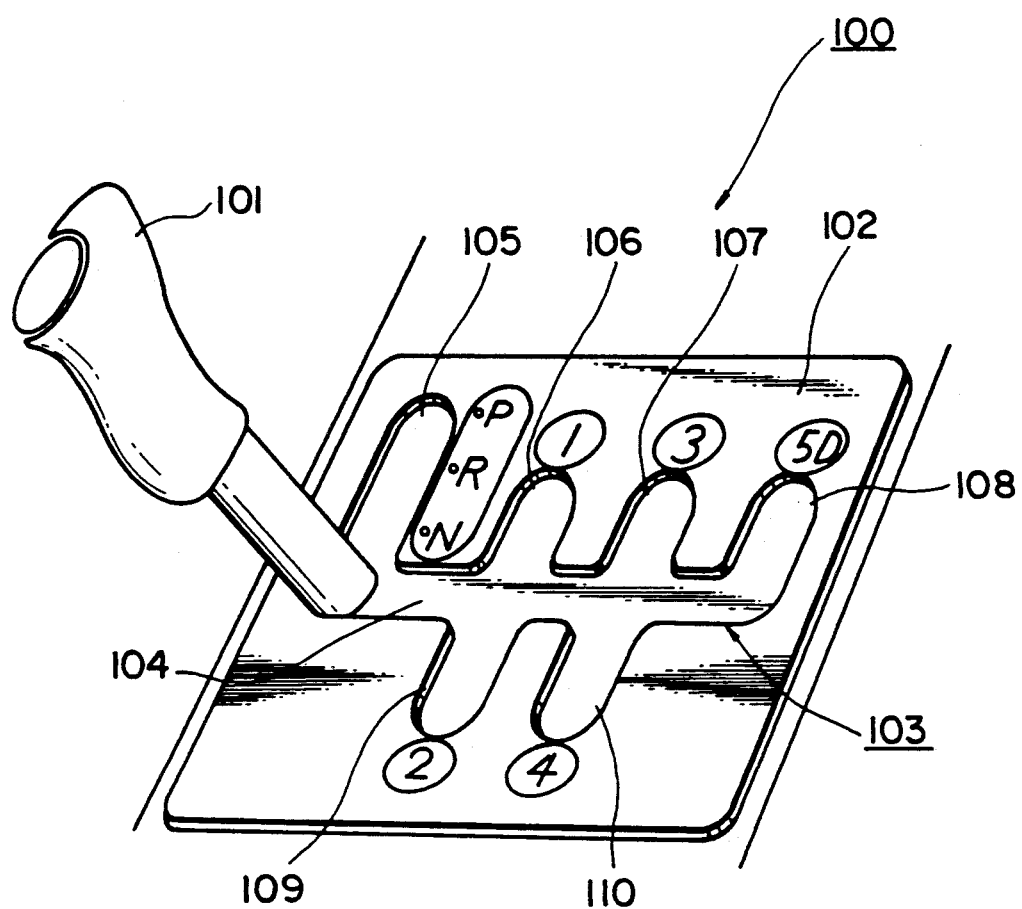
FIG. 1 shows a perspective view of a shift lever assembly of a manual speed selector of an automatic vehicle transmission in accordance with the present invention.

FIG. 1 is a perspective view of a shift lever assembly of a manual speed selector of the automatic vehicle transmission in accordance with the present invention.

As shown in FIG. 1, the shift lever assembly 100 has a shift lever 101 for changing over the running ranges and the shift stages in accordance with the driver's will, and a guide plate 102 for guiding the shift lever 101 longitudinally or laterally.

In the guide plate 102 is formed a guide slit 103 which comprises a slit 104 extending in a lateral direction, four slits 105 to 108 each extending continuously from the slit 104 in an upward longitudinal direction, and two slits 109 and 110 each extending continuously from the slit 104 in a downward longitudinal direction. The shift lever 101 can be moved along the guide slit 103. The ranges P, R, and N are assigned to the slit 105, the first speed stage is assigned to the slit 106, the third speed stage is assigned to the slit 107, the fifth speed stage and the range D are assigned to the slit 108, the second speed stage is assigned to the slit 109, and the fourth speed stage is assigned to the slit 110.

If the fifth speed stage and the range D are assigned to the slit 108 as in this arrangement, they are discriminated between by an automatic/manual selection switch (not shown). Alternatively, a slit to which the range D is independently assigned may be formed below the slit 105, or the slit 105 for the ranges P, R, and N may be formed below the slit 108 as a continuation thereof.

Next, a manual valve disconnection device will be described below.

Figure 5:
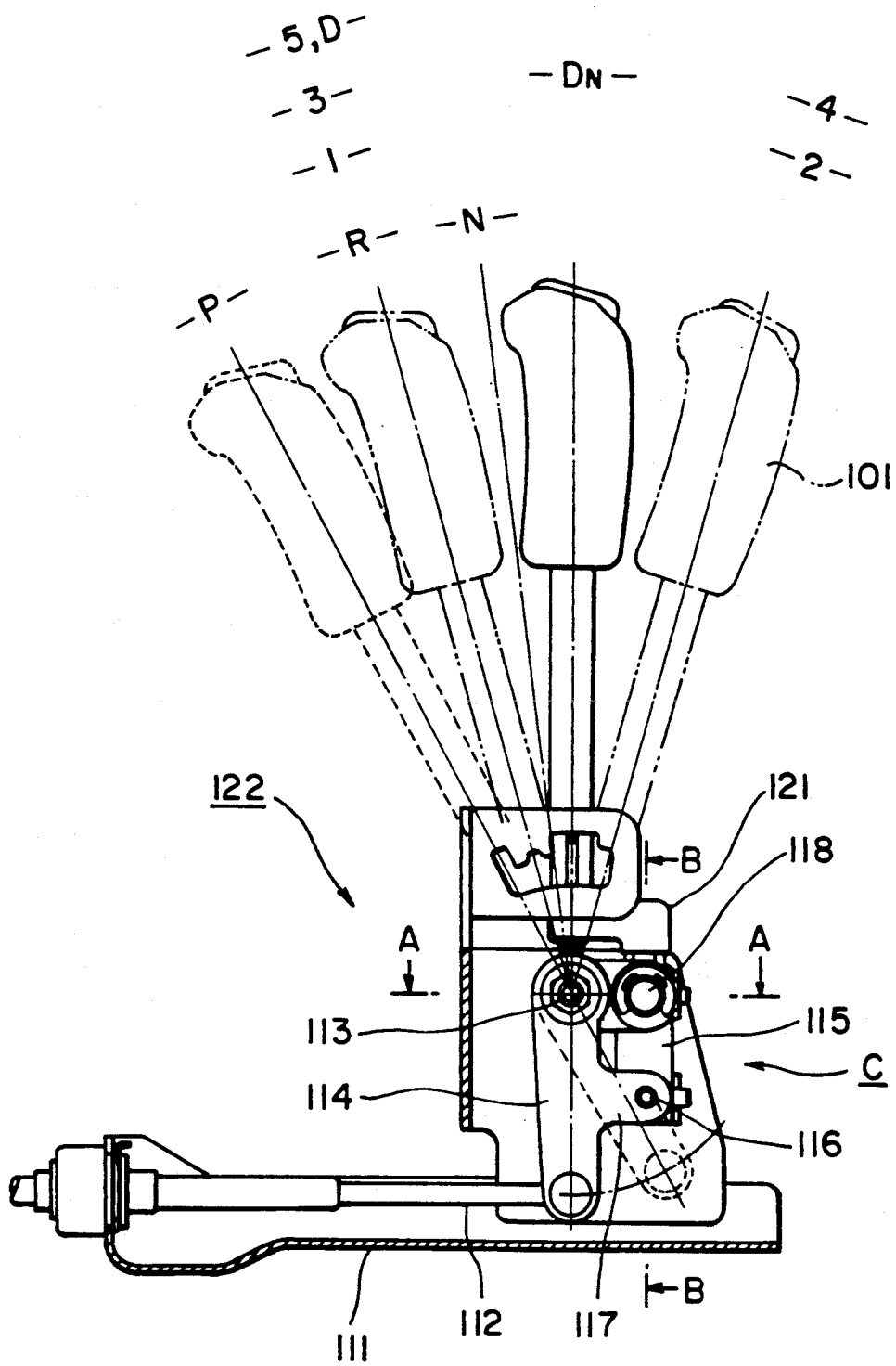
FIG. 5 is a side view of a manual valve disconnection device.
Figure 6:
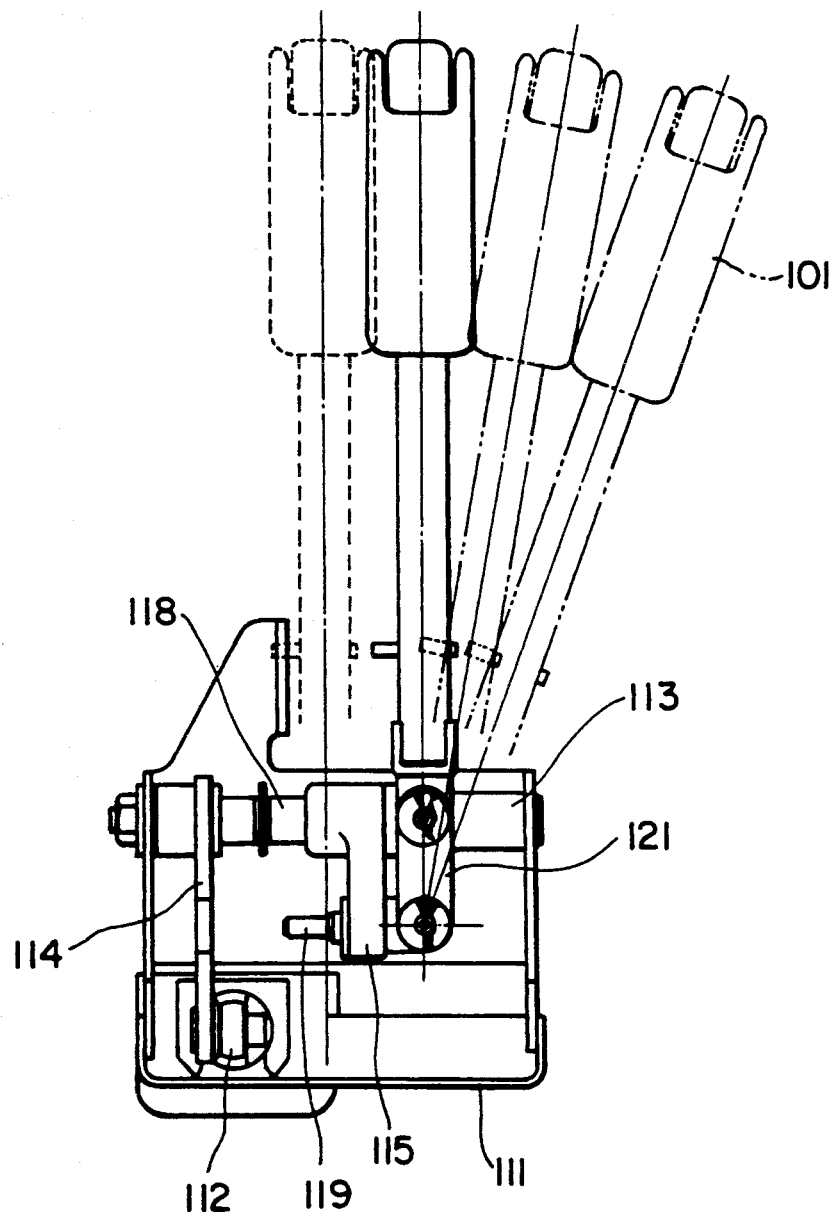
FIG. 6 is a side view in the direction of the arrow C of FIG. 5.

FIG. 5 is a side view of the manual valve disconnection device, FIG. 6 is a side view in the direction of the arrow C of FIG. 5, and FIGS. 7(a) to 7(h) are diagrams of the operation of the manual valve disconnection device. FIGS. 7(a) to 7(d) are cross-sectional views taken along the line A—A of FIG. 5, and FIGS. 7(e) to 7(h) are cross-sectional views taken along the line B—B of FIG. 5.

Figure 7A:
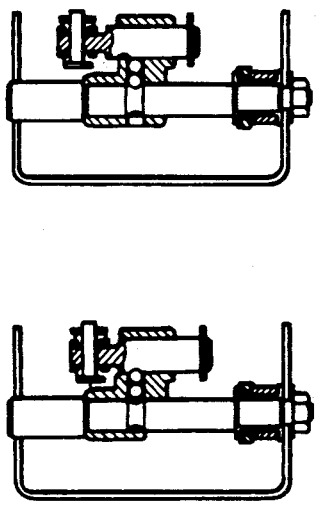
Figure 7B:
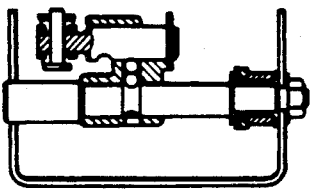

Referring to FIG. 5 and 6, a bracket 111 is attached to a valve body in which the hydraulic circuit 40 shown in FIG. 3 is accommodated. A connection rod 112 connected to the spool 10a of the manual valve 10 is slidably attached to the bracket 111. A fixed shaft 113 is attached to the bracket 111. A first link member 114 is pivotally and rotatably supported at its one end on the fixed shaft 113. A second link member 115 is rotatably and slidably supported at its one end on the fixed shaft 113. An engaging groove 113a and an engaging step portion 113b are formed on the fixed shaft 113, as shown in FIGS. 7(a).

The other end of the first link member 114 is pivotally and rotatably attached to one end of the connection rod 112. An engaging piece 117 having an engaging hole 116 is formed integrally on an intermediate portion of the first link member 114.

The second link member 115 has a perpendicularly bent shape. A moving 118 parallel to the fixed shaft 113 is slidably inserted into the second link member 115, and an engaging rod 119 is inserted in and fixed to a lower portion of the second link member 115. As shown in FIG. 7(a), an engaging groove 118a is formed in the moving shaft 118, and ball 120 is fitted between the moving shaft 118 and the fixed shaft 113 in this groove.

A third link member 121 is pivotally attached to the moving shaft 118 and the engaging rod 119. The shift lever 101 is fixed to the third link member 121.

The operation of the thus-constructed manual valve disconnection device will be described below with reference to FIG. 7.

When the shift lever 101 is at the position for the range P, R, or N shown in FIG. 1, the second link member 115 is linked with the moving shaft 118 while being slidable on the fixed shaft 113 because ball 120 is fitted in the engaging groove 118a of the moving shaft 118 as shown in FIGS. 7(a) to 7(e), and the engaging rod 119 is fitted in the engaging hole 116 of the first link member 114. In this state, as the shift lever 101 is moved to the position P, R and N as shown in FIG. 5, the connection rod 112 is moved by the rotation of the shift lever 101 through the third link member 121, the engaging rod 119 and the first link member 114, so that the spool 10a of the manual valve 10 shown in FIG. 3 is set in the position corresponding to each range.

When the shift lever 101 is further moved from the position N to the position of the slit 104 in the longitudinal direction as shown FIG. 1, the spool 10a of the manual valve 10 is set to the position corresponding to the automatic shifting range D.

As the shift lever 101 is laterally moved from this position along the slit 104, the second link member 115 and the moving shaft 118 are moved together to the right as shown in FIGS. 7(b) to 7(f) since the ball 120 is fitted in the engaging groove 118a of the moving shaft 118, and the engaging rod 119 is disengaged from the engaging hole 116 of the first link member 114. In this state, the spool 10a of the manual valve 10 is maintained in the position corresponding to the automatic shifting range D. As the shift lever 101 is further moved laterally along the slit 104, the second link 115 is brought into abutment with the engaging step portion 113b of the fixed shaft 113. At this position, the shift lever 101 can be moved into the slit 106 or 109 shown in FIG. 1 to be set in the position corresponding to the first speed or second speed stage.

Figure 7C:
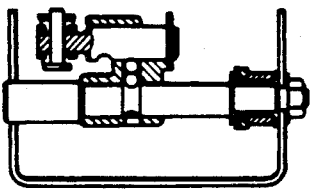
Figure 7E:
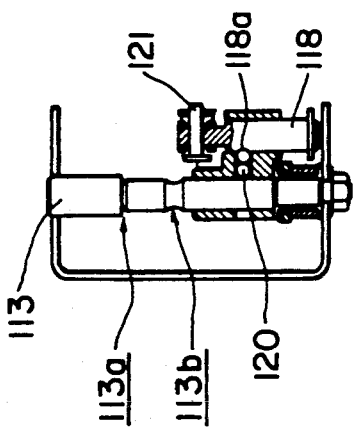
Figure 7F:
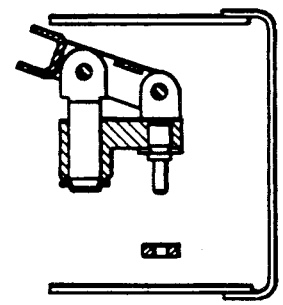
Figure 7G:
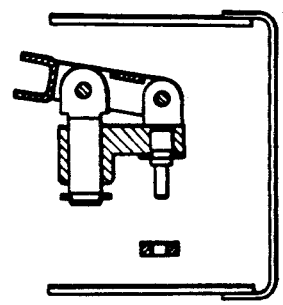
Figure 7H:
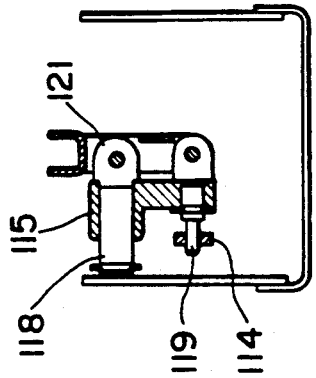

If the shift lever 101 is further moved laterally along the slit 104, the ball 120 is fitted in the engaging groove 113a of the fixed shaft 113 and only the moving shaft 118 is moved to the right to a position shown in FIGS. 7(c) and 7(g), since the second link member 115 is fixed. At this position, the shift lever 101 can be moved into the slit 107 or 110 shown in FIG. 1 to be set in the position corresponding to the third or fourth speed stage. If the shift lever 101 is further moved laterally along the slit 104, only the moving shaft 118 is moved to the right to a position shown in FIG. 7(d) and 7(h). At this position, the shift lever 101 can be moved into the slit 108 shown in FIG. 1 to be set in the position corresponding to the range D or the fifth speed stage.

Thus, when in the manual valve disconnection device the shift lever is moved from the position N shown in FIG. 1 to the lateral slit 104, the manual valve 10 is in the position corresponding to the range D, but the state (N) of the range D shown in FIG. 4, i.e., a neutral state in which the power of the engine is not transmitted to the transmission is enabled by controlling the solenoid valves $S_1$ to $S_3$.

In this specification of the present invention, the position of the shift lever 101 to which the shift lever 101 is moved from the position N to the slit 104 as shown in FIG. 1 and in which the shift lever 101 is not set in any of the shift stage positions is defined as the "transitive position".

The control of the manual speed selector of the automatic vehicle transmission in accordance with the present invention will now be described below with reference to FIG. 8 to 12.

Figure 8:
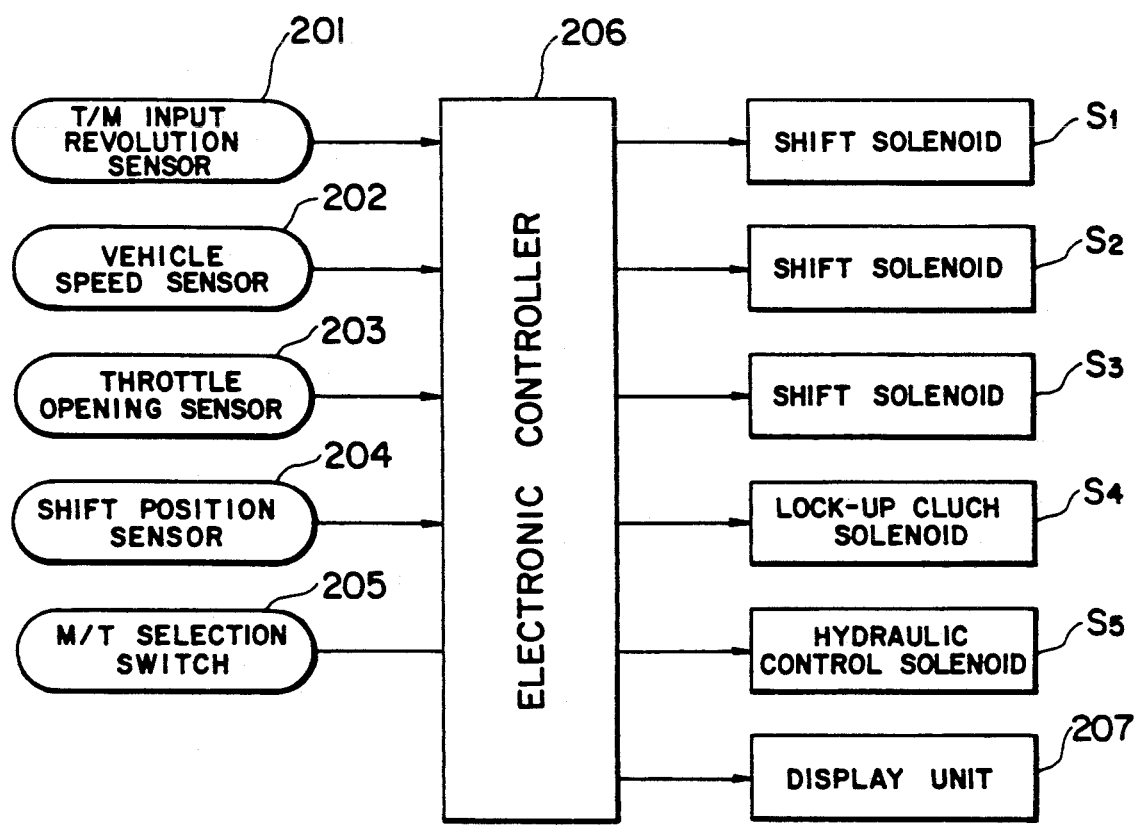
FIG. 8 is a diagram of the construction of a control unit.
Figure 9:
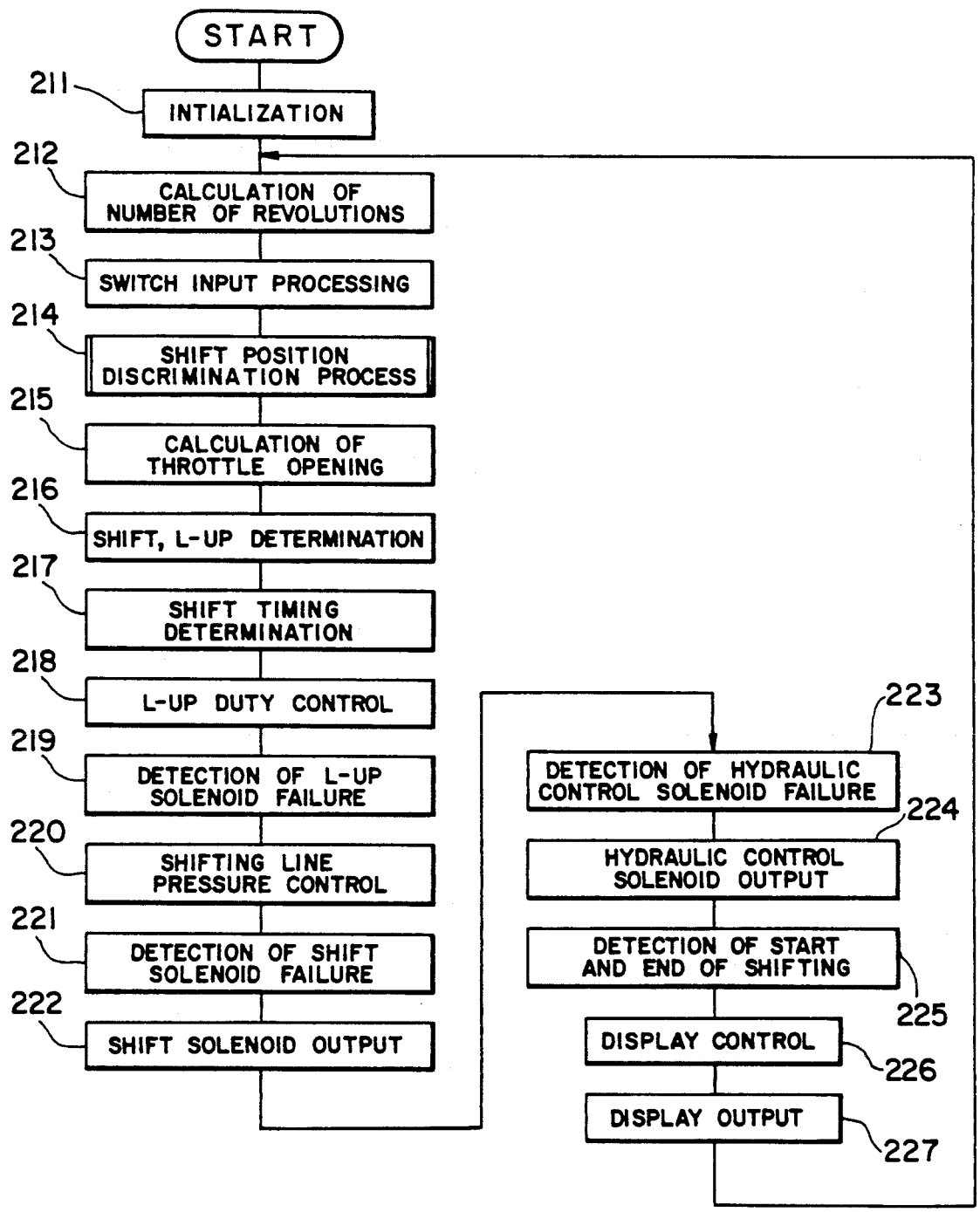
FIG. 9 is a flow chart of a control process.
Figure 10:
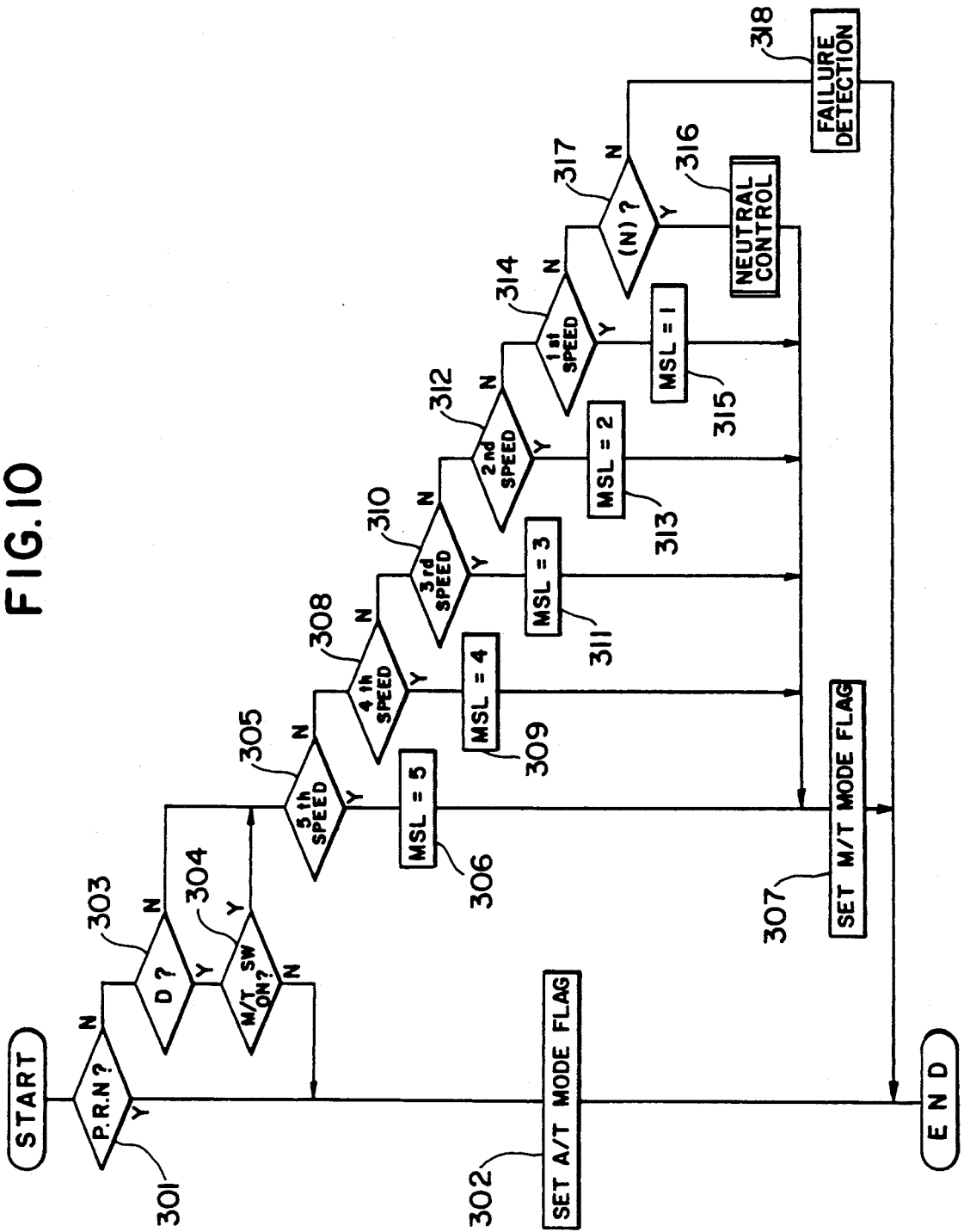
FIG. 10 is a flow chart of a shift position discrimination process.
Figure 11A:
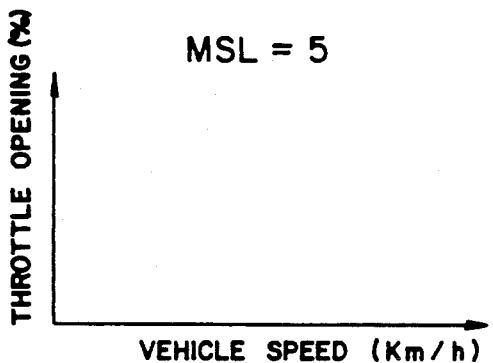
FIGS. 11(a) to 11(f) are diagrams of manual shift information.
Figure 11B:
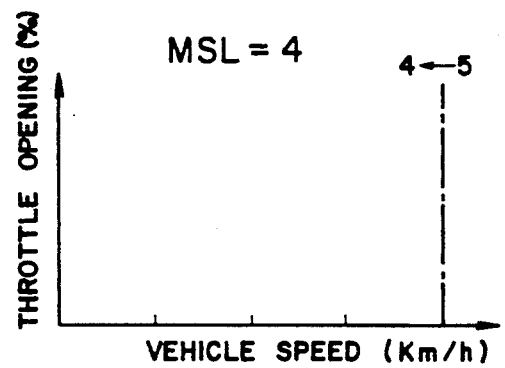
Figure 11C:
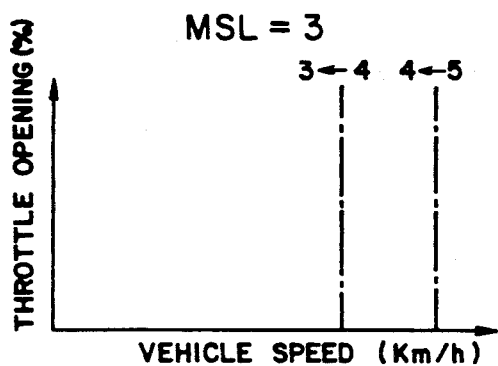
Figure 11D:
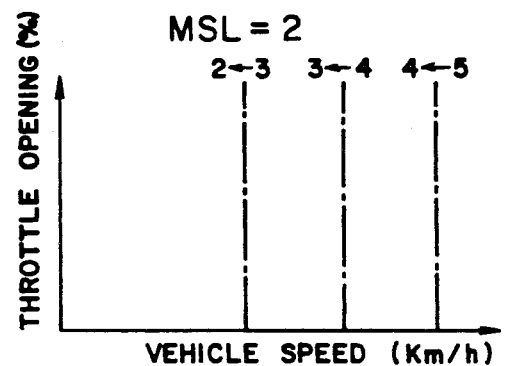
Figure 11E:
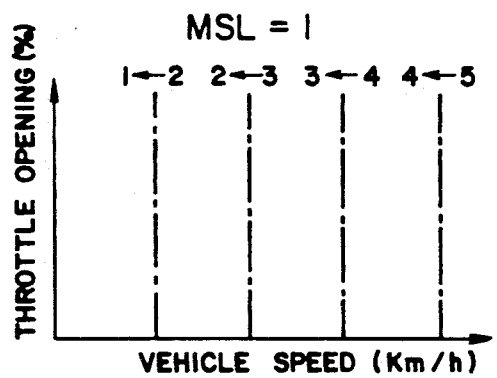
Figure 11F:
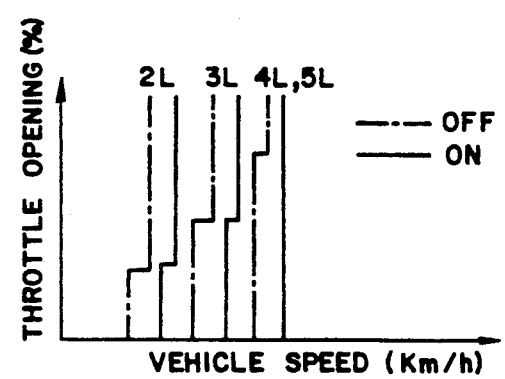
Figure 12:
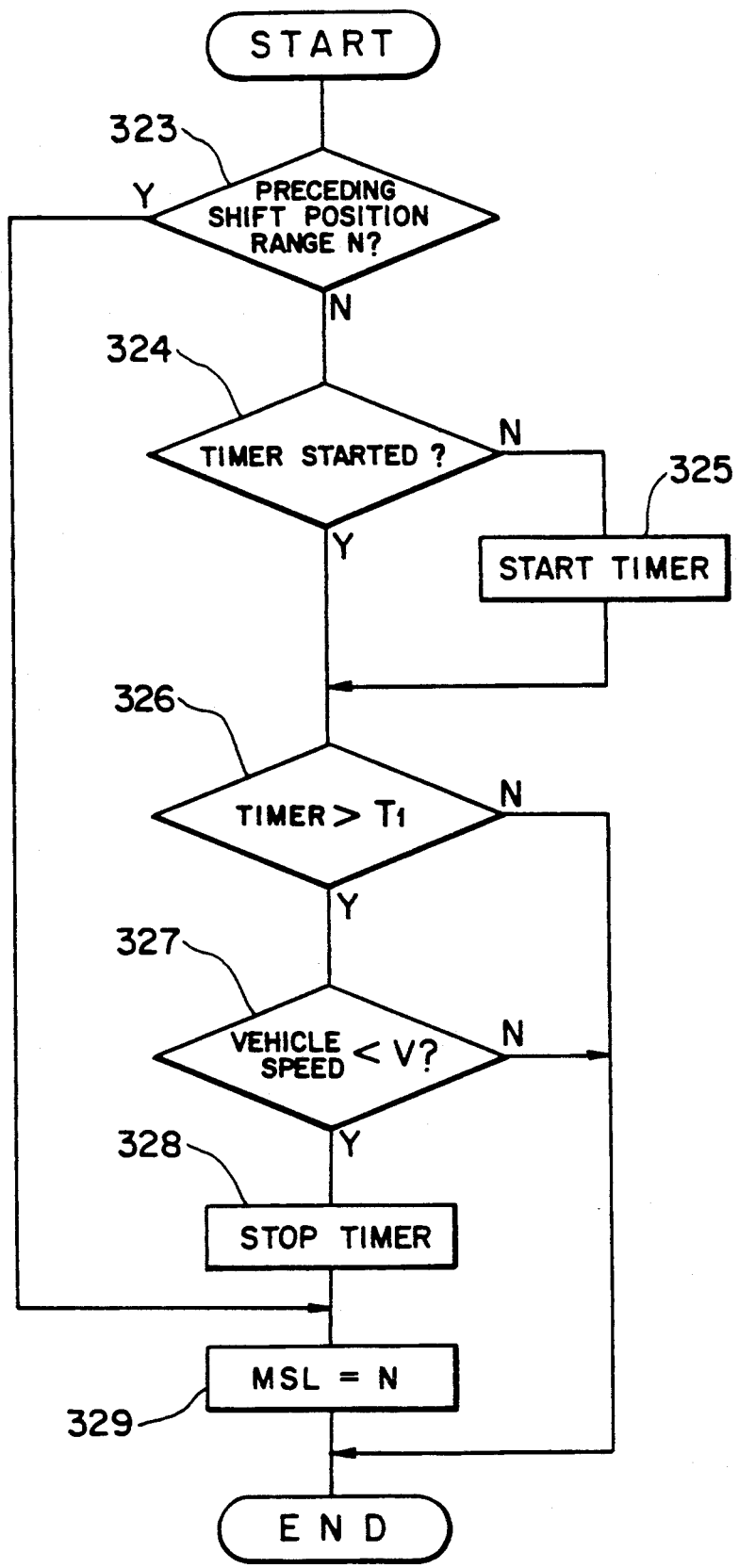
FIG. 12 is a flow chart of a neutral control process.

FIG. 8 is a diagram of the construction of a control unit, FIG. 9 is a flow chart of a control process, FIG. 10 is a flow chart of a shift position discrimination process, FIGS. 11(a) to 11(f) are diagrams of manual shift information, and FIG. 12 is a flow chart of a neutral control process.

Referring to FIG. 8, various sensors: a T/M input revolution sensor 201 for detecting the input revolution speed to the automatic transmission, a vehicle speed sensor 202, a throttle opening sensor 203, and shift position sensors 204 are provided. The shift position sensors 204 serve to detect the positions of the shift lever 101 by being provided at the shift lever positions, i.e., a senor in the slit 105 corresponding to the range P, R, or N, a senor in the slit 106 corresponding to the first speed stage, a senor in the slit 107 corresponding to the third speed stage a senor in the slit 108 corresponding to the fifth speed stage or the range D, a senor in the slit 109 corresponding to the second speed stage, and a senor in the slit 110 corresponding to the fourth speed stage. A manual selection switch 205 is also provided which is turned on if the driver wishes to perform manual shifting. The manual selection switch 205 is not necessary if the range D position is provided independently as described above with reference to FIG. 1.

Detection signals output from these sensors and switch are input into an electronic controller 206 and are processed by this controller by being compared with various categories of stored date and being descriminated based on a program. The electronic controller 206 then outputs signals to the transmission solenoid valves $S_1$ to $S_3$, the fourth solenoid valve $S_4$ for the lock-up clutch, the linear solenoid valve $S_5$ for hydraulic pressure control, and a display 207.

FIG. 9 is a flow chart of data processing in the electronic controller 206.

In step 211, initialization of a RAM area, an I/O port, a timer, a counter and so on is effected.

In step 212, the vehicle speed and the rotational speed input to the automatic transmission are calculated.

In step 213, the states of the shift position sensor 204 and the manual selection switch 205 are detected.

In step 214, a shift position discrimination process is conducted.

This process will be described below with refernce to FIG. 10.

In step 301, determination is made as to whether or not the position of the shift lever 101 corresponds to the range P, R, or N. If YES, the process proceeds to step 302 or, if NO, the process proceeds to step 303.

In step 302, an automatic shifting mode flag is set.

In step 303, determination is made as to whether or not the range D is selected. If the range D is selected, the process proceeds to step 304.

In step 304, determination is made as to whether or not the manual selection switch 205 is on. If YES, the process proceeds to step 305 or, if NO, the process returns to step 302.

If the range D position is provided independently as described above with reference to FIG. 1, step 304 is unnecessary.

Step 305 and subsequent steps are provided for manual shift mode processing.

In step 305, determination is made as to whether or not the position of the shift lever 101 corresponds to the fifth speed. If NO, the process proceeds to step 308 or, if YES, the process proceeds to step 306.

In step 306, a shift diagram MSL=5 shown in FIG. 11(a) and a lock-up diagram shown in FIG. 11(f) are selected as shift information MSL.

In step 307, a manual shift mode flag is set.

In subsequent steps 308 to 315, determination of fourth speed, third speed, second speed and first speed is effected in the same manner, shift diagrams MSL=4, 3, 2, 1 shown in FIG. 11(b) to 11(e) and the lock-up diagrams shown in FIG. 11(f) are selected as shift information MSL, and a manual mode flag is set in step 307.

According to the manual shift information shown in FIGS. 11, the timing of engagement of the lock-up clutch is advanced to enable rapid shifting as shown in FIG. 11(f), while shifting can be effected smoothly according to well-known automatic shift information. Also, as shown in FIGS. 11(a) to (e), a shift-down range is provided with respect to each shift diagram to prevent the engine from overrunning if the transmission is shifted from the fifth speed to the first speed, for example.

If the first speed is not selected in step 314, the shift lever 101 is in the position to which it is laterally moved from the position N shown in FIG. 1 to the slit 104 and in which it is set in no shift stage, that is, the shift lever 101 is in the transitive position. In this case, determination is made again in step 317 as to whether or not the shift lever 101 is in the transitive position (N). If NO, it is determined that a failure has occured, and failure detection processing of step 318 is conducted.

If the shift lever 101 is in the transitive position, the neutral control process of step 316 is conducted.

This process will be described below with reference to FIG. 12.

In step 323, determination is made as to whether or not the shift position selected immediately previously is neutral, i.e., the position corresponding to the range N. If YES, the process proceeds to step 329 and shift information MSL is set in N. If NO, the process proceeds to step 324.

In step 324, determination is made as to whether or not the timer has been started. If YES, the process proceeds to step 326 or, if NO, the process proceeds to step 325 to start the timer.

In step 326, determination is made as to whether or not the timer measurement time is longer than a set time $T_1$. If NO, the main processing is repeated or, if YES, the process proceeds to step 327.

In step 327, determination is made as to whether or not the vehicle speed is smaller than a set V. If NO, the main processing is repeated or, if the vehicle speed is smaller than the set speed, the process proceeds to steps 328 and 329.

In steps 328 and 329, the timer is stopped and shift information MSL is set in N.

After setting the shift information MSL to N, the state N in the range D shown in the operation table of FIG. 4 is established by controlling the solenoid valves $S_1$ to $S_3$ in a later-described step 222 to prepare to establish the neutral state in which the power of the engine is not transmitted to the transmission. In a case where the shift lever 101 is in the transitive position for a short time within the set time, there is no need for establishing the neutral state, and the preceding shift information MSL is set as the present shift information MSL.

Subsequent processing will be described below by referring back to FIG. 9.

In step 215, the throttle opening (%) and eight throttle steps are calculated.

In step 216, in the case of automatic shift mode, shift informatioin MSL including the well-known shift diagrams and the lock-up diagram previously stored is prepared or, in the case of manual shift mode, shift information MSL including the shift diagram and the lock-up diagram according to each shift stage selected in step 214 is prepared, and a shift and engagement of the lock-up clutch are determined from the vehicle speed already calculated and the throttle opening.

In step 217, the timing from shift determination to shift commanding at the time of shifting, the lock-up engagement timing and the line pressure control timing are set. In this case also, these timings are differentiated with respect to the automatic and manual shift modes so that the transmission is smoothly shifted in the automatic shift mode or is rapidly shifted in the manual shift mode.

In step 218, on/off duty control of the lock-up clutch is effected.

In step 219, detection of short-circuit failure or open failure of the fourth solenoid valve $S_4$ for lock-up from the output from this solenoid valve and the input to the monitor circuit is effected.

In step 220, the line pressure control at the time of shifting is effected with the hydraulic control linear solenoid valve $S_5$ by the shifting line pressure control timing determined in step 217.

In step 221, detection of short-circuit failure or open failure of each of the solenoid valves $S_1$, $S_2$, and $S_3$ from the output from that solenoid valve and the input to the monitor circuit is effected.

In step 222, the solenoid valves $S_1$, $S_2$, and $S_3$ are operated in accordance with the shift determination of step 216 and the shift timing determination of step 217.

In step 223; detection of a failure of the hydraulic control linear solenoid valve $S_5$ from the input to the output monitor circuit is effected.

In step 224, a current corresponding to the necessary line pressure determined from the present gear ratio and the throttle opening is supplied to the hydraulic control linear solenoid valve $S_5$.

In step 225, the transmission gear ratio is calculated from the input rotational speed and the vehicle speed and is compared with the gear ratios corresponding to the first to fifth speeds, and the start and the end of shifting of the transmission are detected.

In steps 226 and 227, the state of the transmission is displayed on the display unit.

It should be understood that the foregoing relates to only a preferred embodiment of the invention, and that the claims are intended to cover all changes and modifications of the example of the invention herein chosen for the purposes of the disclosure, which do not constitute departures from the spirit and scope of the invention.

What we claim is:

1. A manual speed selector for an automatic transmission for a vehicle having a plurality of frictional engagement elements and a torque converter with a lock-up clutch, said manual speed selector comprising:
   (a) shift lever means, including a shift lever, for selecting one of a plurality of shift stages in:
      (i) an automatic shift mode position;
      (ii) a manual shift mode position; and
      (iii) a transitive position connecting said automatic shift mode position to said manual shift mode position;
   (b) a hydraulic control system including:
      (i) a manual valve linked to said shift lever, at least in said automatic shift mode position, for movement responsive of movement of said shift lever;
      (ii) a plurality of shifting solenoid valves turned on or off responsive to the selection of a shift stage;
      (iii) a plurality of shift valves, operated by said solenoid valves, for selectively transmitting hydraulic pressure to at least one frictional engagement element to establish a shift stage; and
      (iv) a source of hydraulic pressure in hydraulic communication with the frictional engagement devices through said shift valves;
   (c) means for setting the manual valve to connect said hydraulic pressure source to at least one of the frictional engagement elements when said shift lever is placed in said transitive position; and (d) an electronic controller including means for controlling operation of said solenoid valves in accordance with the position of said manual valve.

2. A manual speed selector for an automatic vehicle transmission according to claim 1, wherein said electronic controller commands faster shifting when said shift lever means is in said manual shift mode position than when in said automatic shift mode position.

3. A manual speed selector for an automatic vehicle transmission according to claim 1, wherein said hydraulic control system further includes pressure control means for controlling the hydraulic pressure supplied to said frictional engagement devices.

4. A manual speed selector for an automatic vehicle transmission according to claim 3, wherein said pressure control means includes a primary regulator valve and a hydraulic control solenoid valve.

5. A manual speed selector for an automatic vehicle transmission according to claim 2, wherein said electronic controller changes the timing of engagement of the lock-up clutch in accordance with selection of the automatic shift mode or the manual shift mode.

6. A manual speed selector for an automatic vehicle transmission according to claim 1, further comprising lock-up control means for changing line pressure for engaging the lock-up clutch.

7. A manual speed selector for an automatic vehicle transmission according to claim 6, wherein said lock-up control means comprises a lock-up control valve and a lock-up solenoid valve.

8. A manual speed selector for an automatic vehicle transmission according to claim 1, further comprising manual valve disconnection means for disconnecting said manual valve from said shift lever responsive to movement of said shift lever to said transitive position.

9. A manual speed selector for an automatic vehicle transmission according to claim 8, wherein said manual valve disconnection means comprises:
(i) a first link member connected to the manual valve;
(ii) a second link member connected to the shaft lever; and
(iii) a third link member for selectively connecting the first link member with the second link member.

10. A manual speed selector for an automatic vehicle transmission according to claim 1, wherein said automatic shift mode position is an I-shaped pattern and said manual shift mode position is an H-shaped pattern.

11. A hydraulic control system for controlling operation of a plurality of frictional engagement devices for establishing various speed ranges in a vehicle transmission including a lock-up clutch, either automatically in an automatic shift mode or in a manual shift mode responsive to manual shifting, said control system comprising:

a manual valve and means for supplying hydraulic fluid pressure to the frictional engagement devices through said manual valve;

shift lever means including a shift lever and a guide slit in which said shift lever moves, said guide slit including:
(1) automatic shift portion for setting said shift lever in one of a plurality of automatic shift positions;
(2) a manual shift portion for setting said shift lever in one of a plurality of manual shift positions; and
(3) a transitive portion connecting said automatic shift portion with said manual shift portion;

a plurality of shift lever position sensors including a shift lever position sensor associated with each of said manual shift positions for detecting the presence of the shift lever in the associated manual shift lever position and generating a manual shift signal;

a plurality of shift valves for operating the frictional engagement devices and a plurality of solenoid valves for operating said shift valves;

an electronic controller including manual control means for controlling operation of said solenoid valves responsive to said manual shift signal in the manual shifting mode and automatic control means for automatically controlling operation of said solenoid valves in the automatic shifting mode; and linking means for linking said manual valve to said shift lever for movement with said shift lever in said automatic shift portion of said guide slit and for positioning said manual valve, by movement of said shift lever into said transitive position, to establish a neutral state wherein hydraulic pressure is supplied to at least one of the frictional engagement devices and wherein the power of the vehicle engine is not transmitted to the transmission.

12. The hydraulic control system of claim 11, wherein said automatic shift portion of said guide slit is a single straight section and said manual shift portion is H-shaped.

13. The hydraulic control system of claim 11 further comprising means for disconnecting said shift lever from said manual valve when said shift lever is moved from said automatic shift portion to the neutral state in said transitive portion of said guide slit.

14. The hydraulic control system of claim 11 wherein said control means controls the timing of engagement of the lock-up clutch so that shifting in the manual control mode is more rapid than in the automatic control mode.

15. The hydraulic control system of claim 11 further comprising a manual selector switch for commanding either the automatic shift mode or the manual shift mode.

16. The hydraulic control system of claim 15, wherein the shift lever position for drive in the automatic shift mode is one of said manual shift positions.

* * * * *